Figure 4:
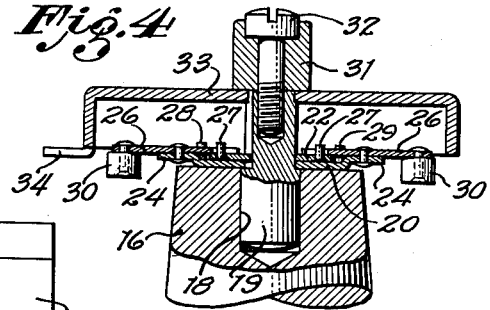

March 20, 1956 W. A. RAY 2,738,805
HANDLE CONNECTION FOR PLUG VALVE
Filed Feb. 16, 1953

Inventor,
WILLIAM A. RAY
By John H. Rouse,
Attorney

United States Patent Office 2,738,805
Patented Mar. 20, 1956

2,738,805

HANDLE CONNECTION FOR PLUG VALVE

William A. Ray, North Hollywood, Calif., assignor to General Controls Co., Glendale, Calif., a corporation of California Application February 16, 1953, Serial No. 337,181

4 Claims. (Cl. 137—560)

This invention relates to control apparatus which includes (1) a valve of the rotatable-plug type for controlling flow of fluid such as fuel-gas, (2) an additional control device such as a safety shut-off valve, pilot-burner valve, or gas igniter, and (3) a common handle for manually operating the plug valve and, while the plug is in a given flow-controlling condition, for actuating the additional control device.

In various patents, such as Nos. 2,257,024, 2,313,890, 2,447,207, 2,472,384 and 2,566,372, I have disclosed the provision of a lost-motion connection between the handle and the plug for preventing the possibility of the additional control device being frictionally held in the position to which it is actuated by the handle—as, if the connection between the handle and the plug were a rigid one, might occur because of the high degree of friction inherent in a plug valve—since in most intended applications of the control apparatus a dangerous condition might be established if the additional control device were unintentionally retained in actuated position.

In my copending application Serial No. 240,305, filed August 4, 1951, now Patent No. 2,664,103, an arrangement is disclosed whereby the full degree of lost motion is permitted only when the handle is disposed for actuating the additional control device; this being a preferred arrangement since the lost motion effect has no value, and may be objectionable, while the plug is being rotated in its normal flow-controlling range.

It is an object of my present invention to accomplish substantially the same results as have been described as accomplished by the arrangements of said patents and application, but without the requirement for lost motion between the handle and the plug; this being done by providing a connection between the handle and the plug which is so constructed and arranged that when the handle is disposed for actuating the additional control device, rotation of the handle effects rotation of the plug, but at low rate and through an angle considerably smaller than that traversed by the handle, so that a relatively weak force (such as the biasing force of an additional control device of usual construction) acting on the handle is capable of returning the same notwithstanding resistance due to plug-valve friction; the connection being such that the handle is in direct driving relation to the plug while rotating it in its normal flow-controlling range.

For full understanding of the invention, and further appreciation of its objects and advantages, reference is to be had to the following detailed description and accompanying drawing, and to the appended claims.

Figure 1:
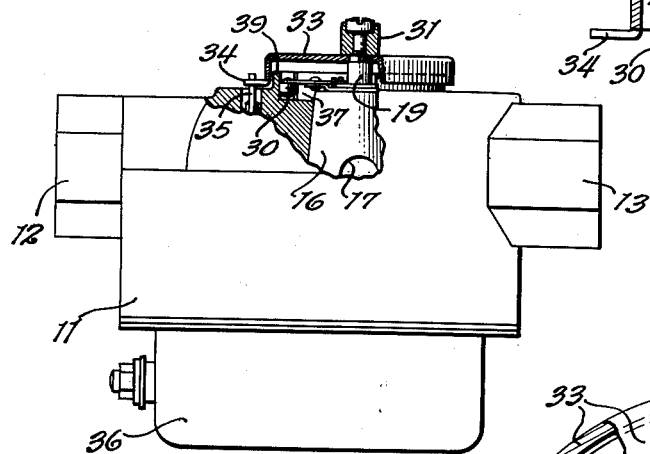
Figure 2:
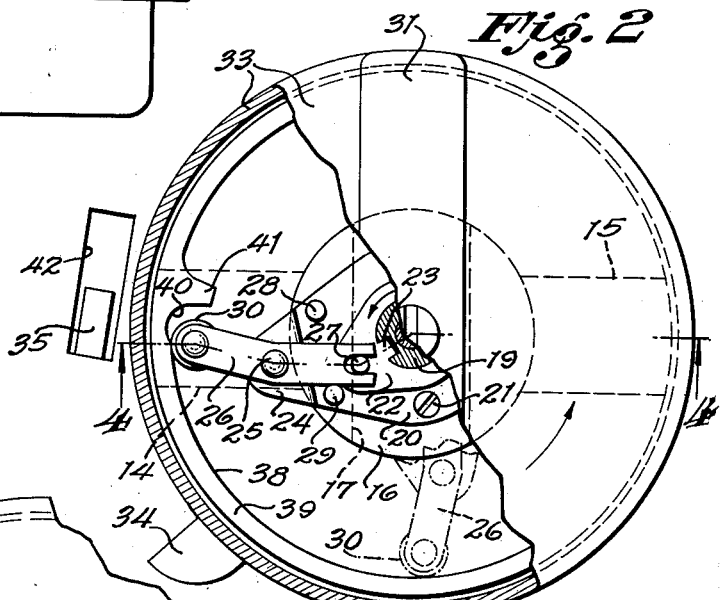
Figure 3:
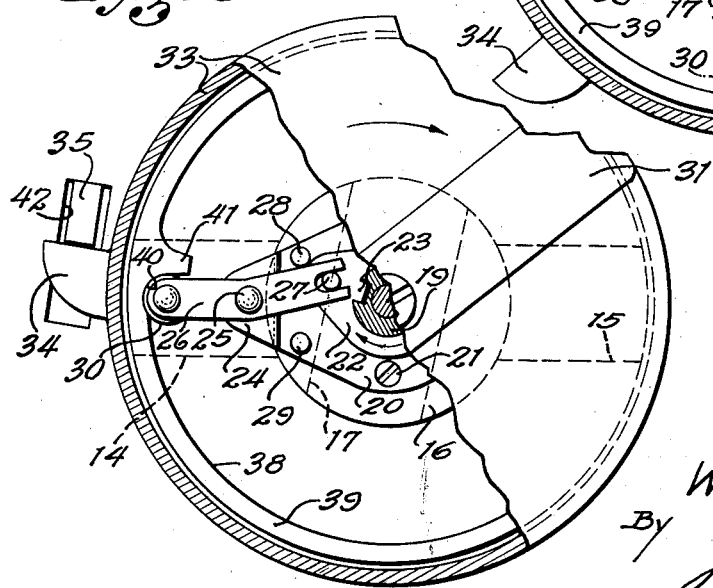

In the drawing:

Figure 1 is an elevational view of a valve structure which includes a rotatable valve-plug; the structure being partly broken-away to show, in section, handle means and a connection according to the present invention for manually rotating the plug and for actuating an additional control device;

Figures 2 and 3 are plan views, to enlarged scale, of the handle means of Fig. 1 partly broken away to show the operative connection between the handle means and the plug; the parts being shown in the individual figures in different positions assumed in operation; and Figure 4 is a fragmentary sectional view taken along the irregular line 4—4 of Fig. 2; Fig. 4 being to a scale between those of Figs. 1 and 2.

Referring first more particularly to Fig. 1, the numeral 11 indicates a valve casing having inlet and outlet connections 12 and 13 for aligned inlet and outlet passages 14 and 15, respectively (see Figs. 2 and 3); communication between which passages is controlled by a tapered plug 16 seated in a correspondingly tapered opening in the casing and having a transverse opening 17 registerable with those passages when the plug is rotated through about 90° from its closed position as shown in the figures.

As can be seen in Fig. 4, the plug 16 has in its top a central bore 18 for a stem 19 whose upper portion is reduced in diameter to fit freely in an aligned opening through a plate 20 secured to the top surface of the plug as by screws 21; this arrangement being such that stem 19 is freely rotatable in bore 18 and is maintained therein by the plate 20. On the plate 20 around stem 19 is another plate 22 having an opening fitting the stem; rotation of plate 22 relative to the stem being prevented by a tongue 23 on the plate conforming to a keyway in the upper part of the stem.

The plate 20 is generally elliptic and is bent at its ends 24 so that the top surfaces of these parts are in the plane of the top surface of plate 22. Pivotally mounted on the ends 24 of plate 20, as by rivets 25, are arms 26 whose inner ends rest on plate 22 and are notched to receive pins 27 secured to and projecting upwardly from that plate; movement of arms 26 being limited by pairs of spaced stop-pins 28 and 29 secured to and projecting upwardly from plate 20. Pivotally mounted on the outer ends of arms 26 are rollers 30.

The parts described in the preceding paragraph are on both sides of the vertical centerline of all of the figures, but appear in duplicate only in Fig. 4. The duplicate arrangement of parts is not essential but is desirable to effect balance of the forces produced in operation of the parts. Therefore, in describing this operation hereinafter, for the sake of simplicity the arrangement will be treated as if there were only one of each of the duplicated parts, as shown in Figs. 1, 2 and 3.

For manually rotating the stem 19 there is a handle 31 which is secured to the top of the stem by a screw 32; these parts also serving to secure to the stem a flanged disk or cap 33 having a central opening conforming to the squared top portion of the stem. Rotation of the handle 31 relative to stem 19 and cap 33 is prevented by eccentric pins (not shown) fitting in corresponding openings in the handle and cap.

Projecting outwardly from the rim of cap 33 is a finger 34 which is adapted, upon clockwise rotation of the cap through about 35° from its position as shown in Fig. 2, to engage a lever 35, pivotally mounted in a recess in the top of valve casing 11, and, by farther rotation of the cap through about 15°, rock the lever to its stopped position as shown in Fig. 3. The lever 35 is biased to the position shown in Fig. 2 and is operatively connected to control means within the casing additional to the flow-controlling means constituted by the valve plug 16. The additional control means may be such as a safety shut-off valve controlling the whole flow of fluid through the casing and normally maintained in open position (after it is first brought to that position by movement, by finger 34, of lever 35 to the position of Fig. 3) by electromagnetic means within a housing 36 shown at the bottom of the casing in Fig. 1; an arrangement of this character being disclosed in my aforementioned Patent No. 2,472,384.

The upper end of valve plug 16 is in a shallow recess 37 (Fig. 1) in the top of casing 11 and the roller 30 rides on the inner surface 38 of the portion 39 of the casing which forms the side wall of this recess. The surface 38 is circular and concentric with plug 16 and handle-stem 19 except for a recess 40 adjoining an abutment 41 for the roller. Recess 40 and abutment 41 are duplicated (but not shown) at diametrically opposite points on surface 38 for cooperation with the additional roller 30 shown at the right in Fig. 4.

Rotation in counterclockwise direction of handle 31 from its position shown in Fig. 2 effects direct rotation of plug 16 since arm 26 is in engagement with stop-pin 29 projecting from plate 20 secured to the plug, and the force of pin 27 on handle-plate 22 is applied to the plug through arm 26, pin 29 and plate 20. With arm 26 in engagement with pin 29, the roller 30 is just clear of the circular surface 38. When the roller 30 and arm 26 reach their broken-line positions shown in Fig. 2, the plug will have been moved through 90° and its opening 17 registers with the inlet and outlet passages 14 and 15 to effect full opening of the plug valve.

When, with the plug valve in its fully open condition, the handle is then rotated in clockwise direction there is a tendency for pin 27 to rock arm 26 counterclockwise out of engagement with pin 29, but such movement of arm 26, in appreciable amount, is prevented by engagement of roller 30 with the surface 38. It is thus clear that direct rotation of the plug 16 is effected by rotation, in either direction, of the handle 31 (and cap 33) between its position corresponding to the fully closed position of the plug wherein the parts are shown in solid lines in Fig. 2, and the position of the handle corresponding to the fully open position of the plug wherein roller 30 and arm 26 are shown in broken lines in Fig. 2.

The lever 35 is shown in Fig. 2 in the position to which it is biased and to which it has been "tripped" as, for example, due to the establishment of an abnormal or unsafe degree of the condition to which the additional control device, with which lever 35 is connected, is responsive. To reinitiate normal operation of the system controlled by the valve structure, the lever or control member 35 must be moved to the other end of slot 42 to effect resetting of the additional control device. As has been described, this is accomplished by clockwise rotation of cap 33 from its Fig. 2 position to bring finger 34 into actuating engagement with the lever. In this resetting movement of the handle means 31—34, counterclockwise rocking of lever 26 about its pivot 25, under the force applied to this lever through pin 27, is no longer prevented. This is because of the recess 40 into which roller 30 now extends. The abutment 41 is so disposed that it is engaged by the roller when the control member 35 is at the upper end of slot 42 and lever 26 in engagement with the upper stop-pin 28; the parts then being in the positions shown in Fig. 3.

In moving finger 34 through about 50° between its positions shown in Figs. 2 and 3 respectively, the plug 16 is moved through only about 12°, as is indicated by the relative positions of the plug-opening 17 in these figures; this reduction of movement of the plug relative to that of the handle means being due to the movement of lever 26 (between stop-pins 29 and 28) permitted while roller 30 is moving into recess 40. It is to be observed that the plug is still in flow-obstructing condition as shown in Fig. 3.

When the resetting operation is completed, the control member 35 is normally retained or latched in its reset position at the upper end of slot 42, and the handle means may then be returned to its normal plug-operating range of Fig. 2 wherein the movements of the handle means and plug are in direct or equal ratio (while roller 30 rides on surface 38).

In the event that, when the resetting operation is performed, conditions are not such as to effect retention of the additional control member 35 in its reset position, and, further, that the handle means is released while in the position of Fig. 3, it is essential, to avoid possible establishment of an unsafe or undesired condition in the system controlled by the valve structure, that the additional control member 35 return to its "safe" position at the lower end of slot 42. For this to occur it is necessary for the biasing force of the additional control member to be able to overcome the friction between the plug and its socket, which parts must fit together relatively tightly to avoid leakage. In the arrangement illustrated, rotation of the plug under the biasing force of control member 35 is facilitated by the high ratio of movement of the handle means relative to that of the plug, whereby while finger 34 is moving counterclockwise through the 15° necessary to permit return of the additional control member to its "safe" position the plug is rotating through only about 4°. If it were desired to increase this ratio, that could be done easily as, for example, by pivoting the lever 26 closer to its outer end.

In the movement of the parts from the position of Fig. 3 to that of Fig. 2, the force applied through the handle means and pin 27 to lever 26 acts to rock the same clockwise, with abutment 41 initially as a fulcrum, so that the plug is rotated counterclockwise; the roller 30 being withdrawn from recess 40 in this operation.

The specific construction herein shown and described is intended merely as illustrative of an arrangement suitable for practicing this invention, the scope of which is defined in the appended claims.

I claim as my invention:

1. In a control structure: a valve comprising an apertured plug rotatable between open and closed positions; an additional control member; manually-operable handle means adapted when rotated from a predetermined position in one direction through one angle to effect rotation of said plug from its closed to its open position, and when rotated from said predetermined position in an opposite direction through another angle to engage and actuate said additional control member; and means forming a connection between said handle means and said plug arranged so that rotation of the handle means through said other angle effects accordant rotation of the plug through an angle considerably smaller than said other angle.

2. In a control structure: a valve comprising an apertured plug rotatable between open and closed positions; an additional control member biased to one controlling position; manually-operable handle means adapted when rotated from a predetermined position in one direction through one angle to effect rotation of said plug from its closed to its open position, and when rotated from said predetermined position in an opposite direction through another angle to engage and actuate said additional control member to another controlling position against the force of its bias; and means forming a connection between said handle means and said plug arranged so that, following actuation by the handle means of said additional control member to its other controlling position, return movement of the handle means through said other angle to its preceding position effects rotation of the plug at low rate and through an angle considerably smaller than said other angle.

3. In a control structure: a valve comprising an apertured plug rotatable between open and closed positions; an additional control member; manually-operable handle means adapted when rotated from a predetermined position in one direction through one angle to effect rotation of said plug from its closed to its open position, and when rotated from said predetermined position in an opposite direction through another angle to engage and actuate said additional control member; and means forming a connection between said handle means and said plug arranged so that rotation of the handle means in either direction through said one angle effects movement of the plug through the same angle, but rotation of the handle means in either direction through said other angle effects movement of the plug through an angle considerably smaller than said other angle.

4. In a control structure: a valve comprising an apertured plug rotatable between open and closed positions; an additional control member biased to one controlling position; manually-operable handle means adapted when rotated from a predetermined position in one direction through one angle to effect rotation of said plug from its closed to its open position, and when rotated from said predetermined position in an opposite direction through another angle to engage and actuate said additional control member to another controlling position against the force of its bias; and means forming a connection between said handle means and said plug arranged so that rotation of the handle means in either direction through said one angle effects movement of the plug through the same angle, but rotation of the handle means in either direction through said other angle effects movement of the plug through an angle considerably smaller than said other angle.

References Cited in the file of this patent

UNITED STATES PATENTS 2,353,759  Ray _____ July 18, 1944